United States Patent

Jouvaud et al.

[11] Patent Number: 5,158,590
[45] Date of Patent: Oct. 27, 1992

[54] PROCESS FOR MELTING AND REFINING A CHARGE

[75] Inventors: Dominique Jouvaud, Paris; Louis Pascarel, Gif-sur-Yvette; Bernard Genies, Bures-sur-Yvette, all of France

[73] Assignee: L'Air Liquide, Societe Anonyme pour L'Etude el L'Exploitation des Procedes Georges Claude, Paris, France

[21] Appl. No.: 673,180

[22] Filed: Mar. 18, 1991

[30] Foreign Application Priority Data

Mar. 16, 1990 [FR] France ............................. 90 03373

[51] Int. Cl.$^5$ ............................................ C03B 5/225
[52] U.S. Cl. ......................................... 65/134; 65/136
[58] Field of Search .................. 432/210, 181; 65/134, 65/135, 136, 347

[56] References Cited

U.S. PATENT DOCUMENTS

| | | | |
|---|---|---|---|
| 2,616,221 | 11/1952 | Hanson. | |
| 3,129,930 | 4/1964 | Labat-Camy. | |
| 3,426,653 | 1/1969 | Boettner | 65/134 |
| 3,475,151 | 10/1969 | Briggs | 65/135 |
| 3,592,623 | 7/1971 | Shepherd | 65/135 |
| 3,741,742 | 6/1973 | Jennings | 65/135 |
| 3,887,326 | 6/1975 | Townley | 432/99 |
| 4,818,221 | 4/1989 | Besne | 65/135 |

FOREIGN PATENT DOCUMENTS

| | | |
|---|---|---|
| 0115863 | 8/1984 | European Pat. Off. . |
| 2015597 | 11/1970 | Fed. Rep. of Germany . |
| 2215399 | 8/1974 | France . |

Primary Examiner—Joye L. Woodard

[57] ABSTRACT

Process for melting and refining a charge which is continuously introduced in raw condition at the inlet of a furnace and extracted in liquid condition at the bottom thereof, with heat transfer towards at least a substantial portion thereof by wall mounted flame burners directed towards the charge in which at least part of the flames result from the combustion of an industrial mixture of fuel and oxygen. For one or more of the flames in the refining zone, there is provided a pulsating combustion with cyclic variations of the oxygen and fuel feeds, including periods of maximum activity with flames of high heat capacity which alternate with periods of rest with substantially reduced and even completely nullified heat capacity. Application for example to the preparation of glass.

6 Claims, 2 Drawing Sheets

PROCESS FOR MELTING AND REFINING A CHARGE

BACKGROUND OF INVENTION (a) The present invention concerns the melting and refining of a charge which is continuously introduced at the inlet of a furnace and extracted in refined condition at the bottom thereof, with heat transfer towards at least a substantial portion of said charge by means of wall mounted flame burners directed towards said charge, in which at least part of said flames result from the combustion of an industrial mixture of fuel and oxygen.

(b) Description of Prior Art

In the technique normally used for this type of process, where the furnaces operate continuously, the flames are also produced continuously, with adjustment of the power transferred to the charge, which may be carried out automatically by means of heat probes associated with a power optimizing regulator.

Flames of aero-combustible burners essentially heat by convection and radiation, but it is known that oxy-combustible flames radiate much more than they produce convection. In addition to these two complementary effects, the mechanical effect resulting from the impulse of the flame on the surface of the charge should be noted. Because of the impulse and the inclination of the burner, it is possible to obtain effects which are more or less effective on accumulations, lumps or foams which float at the surface. On the other hand, the aero-combustible flames as well as the oxy-combustible flames produce a certain quantity of polluting gases depending on the concentrations of nitrogen, oxygen and other impurities, and also on the temperature, as well as on the aerodynamic phenomena which are hardly qualifiable but of which the effects are known.

With respect to the particular case of glass production, it is possible to realize that there are one or more burners which maintain the jacket of the furnace at a given temperature and ensure the melting of the material in the furnace, the melting zone occupying ⅔th of the length of the furnace and the refining zone located at the bottom of the furnace generally containing homogeneous liquid glass. In the melting zone, the material is loaded at the inlet of the furnace and floats on a bath of liquid glass. As the compact mass moves into the furnace, it is broken up, melts and falls into pieces to form islands, or lumps, which will slowly move towards the refining zone. It is generally admitted that the quality of glass often depends on a clean and very homogeneous refining zone. The good operation of the process constitutes, however, a hard to reach equilibrium between an appropriate power of the flames, a maximum vault temperature and a clear refining zone. Any deviation would upset the equilibrium and produce an accumulation of lumps in the refining zone, which would cause a degradation of the quality of the glass. For a fixed quality and under a vault temperature near the critical threshold, there corresponds a maximum production which cannot be exceeded under the present conditions without obstructing the refining zone.

SUMMARY OF INVENTION

The present invention aims at improving the productivity by:
keeping the lumps outside the refining zone;
increasing the heat yield of the process;
not exceeding the critical threshold of temperature allowable in the vault,
and this is made possible by controlling the following conditions:
either an increase of production for the same quality,
or an improvement of the quality under constant production,
or a power decrease under the same production and quality.

and these objects of the invention are achieved in that for one or more of said essentially active flames in the refining zone, there is provided a pulsating combustion with cyclic variations of the oxygen and combustible feeds, including periods of maximum activity with a flame of high heat capacity, interrupted by periods of rest with a flame of substantially and even completely nullified heat capacity.

With the pulsating combustion, refining of the charge can be carried out under optimum conditions. As a matter of fact:

on the one hand the convective transfer increases when there are provided timed spatial modifications with respect to flows. The use of pulses considerably modifies the wall constraints and therefore increases convection at the surface of the charge. Simultaneously, the mechanical impulse of the fluids contacting the material to be heated being irregular, the movements produced by the pulses enable a more rapid melting of the materials (accumulations which are present at the surface) by increasing the time of contact with the flame. In the presence of foams which are pushed away, the pulses therefore have the property of increasing the size of "clean" surface and improving the quantity of the energy which is introduced into the charge by radiation. In this manner, the result is an increase of the convective radiating transfers, the latter leading to a decrease of the viscosities of the materials being melted, and producing an increase of the surface movements;

on the other hand, the pulsating combustion also produces variations of the concentrations of the combustible materials, fuels and combustion products. These modifications of concentrations have a direct influence on the formation of polluting materials such as nitrogen oxides, and by modifying and shifting the frequency, it is possible to decrease the formation of these nitrogen oxides;

moreover, having adjusted the mechanical effect of these pulsating flames, a timed adjustment of power is used to measure the energy to be conveyed to the charge and this is obtained by alternately operating the burners, inversely associated with time out, which will enable measuring the dissipated energy with high precision, and provide the advantage of an improved heat yield, resulting in a decrease of the fuel energy introduced, for a constant production.

According to an embodiment, with a plurality of adjacent flames, which possibly cross over one another, there is provided a flame pulse comprising a rest period with substantially reduced or even completely annihilated heat capacity which lasts longer than an active period wherein the flame is produced with high heat capacity, so that an active period of any flame from said plurality of flames is followed by a period of rest of the entire plurality of flames. In this manner, in some furnaces, for example in loop ovens, it would be interesting to cause two flames to meet, one of which is aero-combustible and carries a substantial nitrogen ballast, the other, which is oxy-combustible, being at clearly higher temperatures. As a result of the dilution that the aero-combustible flame produces, the area wherein these two flames meet prevents excessive temperatures from being reached in the vault, while bringing a substantial energy to the charge. It is then advantageous to position an aero-combustible flame which is adjacent to or crosses over an oxy-combustible flame and at a higher level than the warmer oxy-combustible flame.

According to a preferred embodiment, the flames which undergo a pulsating combustion are of the pre-combustion type inside the burner, and advantageously, a burner of the type described in French Patent No. 2,644,558 of Mar. 16, 1989 is used. As a matter of fact, since the aim is to produce maximum impulses associated with an excellent heat efficiency, the design of the burner has been choosen to enable exceeding the physical limits associated with temperature (sonic speeds of the fluids in particular), and for this purpose, in order to combine a mechanical effect conditioned by the impulse and the power, with a heat effect conditioned by a mixture of fuel and combustible material free from combustion product, a type of burner has been designed and used enabling a pre-combustion to be initiated inside a burner chamber, to simultaneously give a preheating of the combustive and combustion materials to increase the sonic speed and ensure a blocking of the radial speeds, thus provoking an increase of the longitudinal speeds. This design has, in addition, the advantage of initiating the combustion without any pollution, which guarantees a maximum combustion speed and flame temperature.

According to another preferred embodiment, the flames which undergo a pulsating combustion are angularly inclined towards the surface of the molten charge during the refining operation and are also angularly inclined in the upstream direction with respect to the displacement of the charge during melting and refining. Similarly, the burner can be more or less extended along its longitudinal axis. In this manner, there is simultaneously obtained:

- a clearing of the surface of the bath;
- a blocking of the non molten materials in the melting zone;
- a maximum heat transfer towards the charge with minimum reflection towards the vault;
- and an operation of the burners under acceptable conditions so as for example not to deteriorate the tapping hole.

BRIEF DESCRIPTION OF DRAWINGS

The invention is now illustrated by way of example, with reference to the annexed drawings, in which.

DESCRIPTION OF PREFERRED EMBODIMENTS

Figure 1:
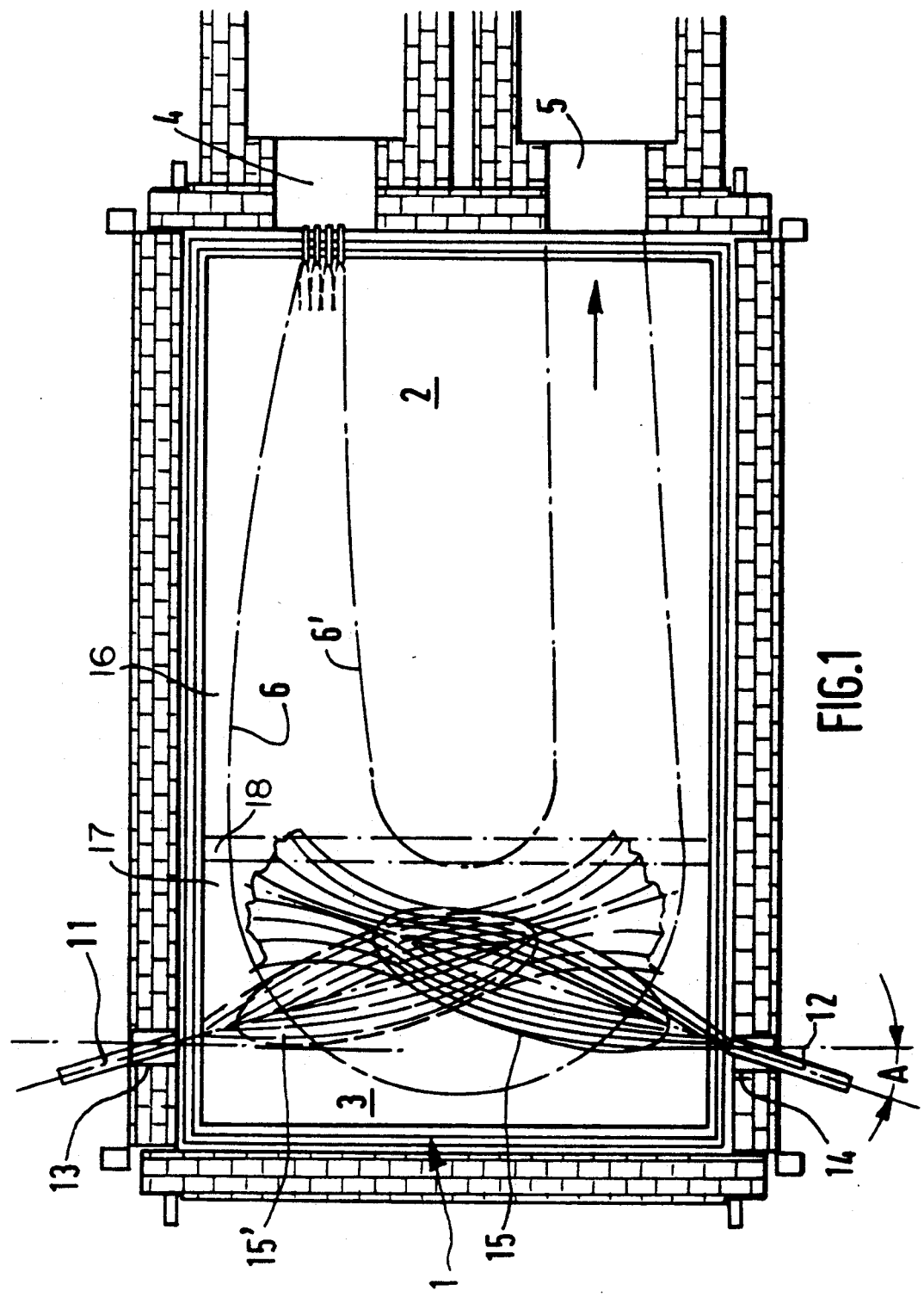
FIGS. 1 and 2 are respective top plan and cross sectional schematic representations of a furnace for the preparation of glass, of the loop type.
Figure 2:
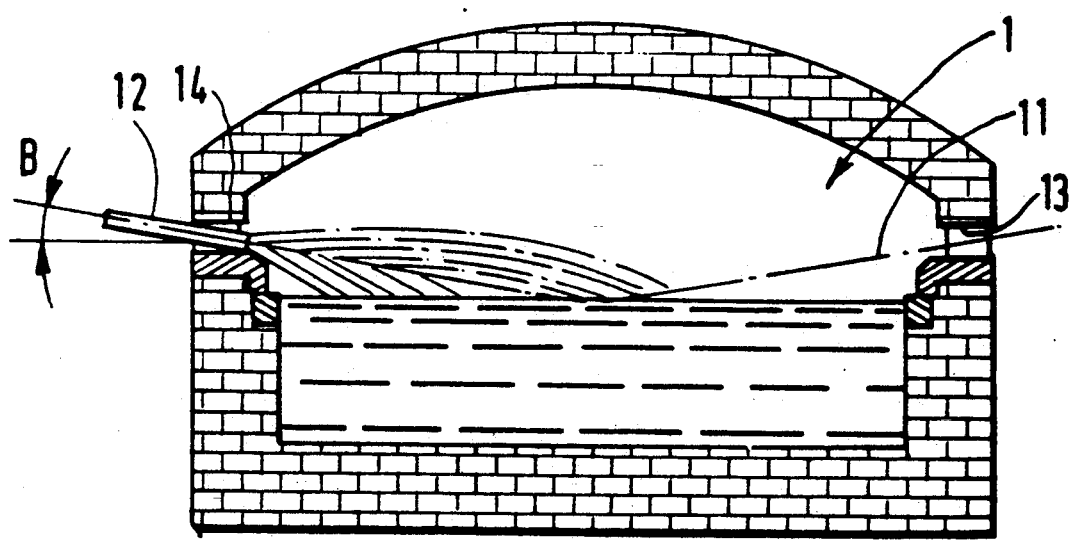

With reference to FIGS. 1 and 2, a furnace for preparing glass, of rectangular shape 1, includes a trap for loading the charge located above the side of the upstream zone 2 and a bottom opening for extracting refined glass at the downstream end 3. Wide tapping holes 4 and 5 are provided at the upstream end 2 with positioning of the aero-combustible burners not represented producing heating flames with introduction of combustion air through the tapping holes 4 and 5, and this in alternate fashion by starting first in tapping hole 4 only (circulation of the fumes according to outline 6—6' towards tapping hole 5 which serves as an evacuator and heat recuperator) followed by tapping hole 5 only (circulation of the fumes according to this same outline 6—6' towards the tapping hole 4 then serving as heat evacuator-recuperator). In the downstream zone 3, there are provided two burners 11 and 12 for oxygen and combustible material through two wall openings 13 and 14, each burner being inclined at an angle A in the upstream direction and at an angle B towards the surface of the bath.

There is thus produced in the upstream portion of the furnace a wide melting zone 16 which is separated from a refining zone 17 at the downstream portion thereof by means of a so-called narrow whirling zone 18.

The two burners 11 and 12 operate with alternate pulsating combustion, so that a single flame 15 only is produced, alternately originating from the burner 11 then at 15' from burner 12, with a rest period as soon as some flame 15—15' is out. For example, burner 11 produces a flame for a period of 20 to 40 seconds, which is followed by a stop or rest period of 10 to 20 seconds, after which burner 12 produces a flame for a period of 20 to 40 seconds, etc...

In the arrangement described, the following advantages have been achieved:

- an increase of the surface of impact with better radiating transfer (heat action);
- an increase of the time of residence of the non molten products which float at the surface as a result of a decrease of their transit speed (mechanical action of the flame;
- a notable decrease of the heat loss as compared to the technique of burners with continuous heating, while obtaining identical heat and mechanical effects.

It should be noted that these improvements are obtained without exceeding the critical heat values of operation of the process (in particular- vault temperature).

In addition, it has been established that the quantities of nitrogen oxide formed by heat effect were substantially reduced by adjusting the frequencies and dephasing of the fluids, all the other conditions remaining identical (power, heat losses and air introduced).

EXAMPLE OF INDUSTRIAL APPLICATION OF THE INVENTION

The industrial application is carried out in a glass loop furnace drawing 200 t/d.

| type of furnace | loop type with a frequency of inversion of the air-gas burners every 20 minutes |
|---|---|
| aero-fuel power | 10.1 MW |
| electrical power | 1027 KW (immersed resistances) |
| surface | 60 m$^2$ |
| type of glass | white |
| nomical capacity | 220 t/d |

In this known furnace two burners oriented towards the melting zone, as illustrated in the drawings, have been placed at the level of the refining zone: Characteristics of the oxy-combustible burners:

Adjustable precombustion chamber;

Power adjusted at the limit of detachment of the flame;

Sonic speed in the precombustion chamber close to 400 m/s;

Operation of the burners alternating with periods of stop to measure the power introduced.

The invention is applicable to different fields such as, for example:

- Rotary furnace: cement, cast iron, ceramic, zinc, wastes, etc... to locally modify the melt speed and displacements of the materials at the surface;
- Glass loop furnace of the type "Unit melter" with traverse burners to locally modify the melt speeds and displacements of the materials at the surface;
- Arc furnace: the interest of this technique for this type of furnace is immediate, since it is intended in this application to associate strong modulating impulses with controlled heat transfers in order to decrease cost;
- Hearth furnace with flat bath: possibility to use this technique in aluminum, cast iron, special steels, copper furnaces, etc... to locally modify the concentrations and heat profiles;
- Rotary waste furnace: the high impulse enables to provide heat conditions at a distance, in order to modify the curve of axial temperatures without introducing too much energy in the furnace.

Heat treatment for homogenization of an atmosphere or for the remote modification of the compositions.

We claim:

1. A process for producing a refined material from a raw material, comprising the steps of charging the raw material at one end of a furnace, heating the content of the furnace so as to melt the raw material and form a molten bath of said raw material, and withdrawing refined material from a refining zone of the molten bath at the opposite end of the furnace, further comprising the steps of generating, adjacent said opposite end, at least two oxy-fuel flames from a mixture of fuel and oxygen, directing the oxy-fuel flames toward the molten bath in said refining zone in different directions from different locations, and alternately varying the heating capacity of each of said oxy-fuel flames between a higher heating capacity and a lower heating capacity, in such a sequence as to generate one oxy-fuel flame having a higher heating capacity when another oxy-fuel flame has a lower heating capacity.

2. The process of claim 1, further comprising the step of orientating said at least two said oxy-fuel flames so that they emanate from opposite sides of said opposite end of the furnace.

3. The process of claim 1, further comprising the step of imparting momentarily to said oxy-fuel flames simultaneously said lower heat capacity.

4. The process of claim 1, wherein said material is glass.

5. The process of claim 1, wherein said mixture consists essentially of fuel and oxygen.

6. The process of claim 1, wherein the time during which said flames have said higher heating capacity is less than one minute.

* * * * *